(12) United States Patent
Mochizuki et al.

(10) Patent No.: US 9,031,784 B2
(45) Date of Patent: May 12, 2015

(54) NAVIGATION SYSTEM AND NAVIGATION METHOD

(71) Applicants: Atsushi Mochizuki, Okazaki (JP); Yasuki Hosoi, Okazaki (JP); Shogo Sugimoto, Okazaki (JP)

(72) Inventors: Atsushi Mochizuki, Okazaki (JP); Yasuki Hosoi, Okazaki (JP); Shogo Sugimoto, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 301 days.

(21) Appl. No.: 13/665,549

(22) Filed: Oct. 31, 2012

(65) Prior Publication Data

US 2013/0124085 A1    May 16, 2013

(30) Foreign Application Priority Data

Nov. 14, 2011    (JP) ................................. 2011-248149

(51) Int. Cl.
  *G01C 21/00*    (2006.01)
  *G01C 21/34*    (2006.01)

(52) U.S. Cl.
  CPC .................................. *G01C 21/3415* (2013.01)

(58) Field of Classification Search
  None
  See application file for complete search history.

(56) References Cited

U.S. PATENT DOCUMENTS

| | | | | |
|---|---|---|---|---|
| 5,311,434 | A * | 5/1994 | Tamai | 701/413 |
| 6,347,278 | B2 * | 2/2002 | Ito | 701/411 |
| 6,453,235 | B1 * | 9/2002 | Endo et al. | 701/428 |
| 6,466,866 | B1 * | 10/2002 | Sato | 701/416 |
| 6,519,528 | B2 * | 2/2003 | Endo et al. | 701/428 |
| 6,845,322 | B1 * | 1/2005 | Chao et al. | 701/411 |
| 7,706,967 | B2 * | 4/2010 | Knockeart et al. | 701/119 |
| 2001/0005809 | A1 * | 6/2001 | Ito | 701/210 |
| 2002/0072849 | A1 * | 6/2002 | Endo et al. | 701/211 |
| 2004/0215392 | A1 * | 10/2004 | Nam et al. | 701/210 |
| 2005/0216190 | A1 * | 9/2005 | Obata | 701/209 |
| 2006/0089797 | A1 * | 4/2006 | Suzuki et al. | 701/211 |
| 2006/0116818 | A1 * | 6/2006 | Chao et al. | 701/211 |
| 2006/0178817 | A1 * | 8/2006 | Suzuki et al. | 701/209 |
| 2007/0294024 | A1 * | 12/2007 | Sasaki | 701/200 |
| 2008/0183376 | A1 * | 7/2008 | Knockeart et al. | 701/119 |
| 2009/0171562 | A1 * | 7/2009 | Shimada | 701/201 |
| 2011/0144906 | A1 * | 6/2011 | Suzuki et al. | 701/201 |
| 2011/0202271 | A1 * | 8/2011 | Kruithof | 701/201 |
| 2012/0303270 | A1 * | 11/2012 | Su et al. | 701/431 |
| 2013/0124085 | A1 * | 5/2013 | Mochizuki et al. | 701/466 |
| 2013/0197795 | A1 * | 8/2013 | Basnayake et al. | 701/412 |

FOREIGN PATENT DOCUMENTS

JP    A-2011-47886    3/2011

* cited by examiner

*Primary Examiner* — Yonel Beaulieu
*Assistant Examiner* — Krishnan Ramesh
(74) *Attorney, Agent, or Firm* — Oliff PLC

(57) ABSTRACT

According to navigation systems and methods, when a detected current position has deviated from a guidance route, a navigation device transmits a reroute calculation condition to an information distribution center including the current position and the destination. Based on the reroute calculation condition, the information distribution center determines whether a distance from the current position to a closest adjacent link is equal to or shorter than a predetermined distance. When the distance from the current position to the closest adjacent link is longer than the predetermined distance, the information distribution center distributes to the navigation device reroute prohibition information including information regarding the adjacent link and a maximum waiting time. The maximum waiting time is a time that must elapse before the navigation device can again transmit the reroute calculation condition.

14 Claims, 6 Drawing Sheets

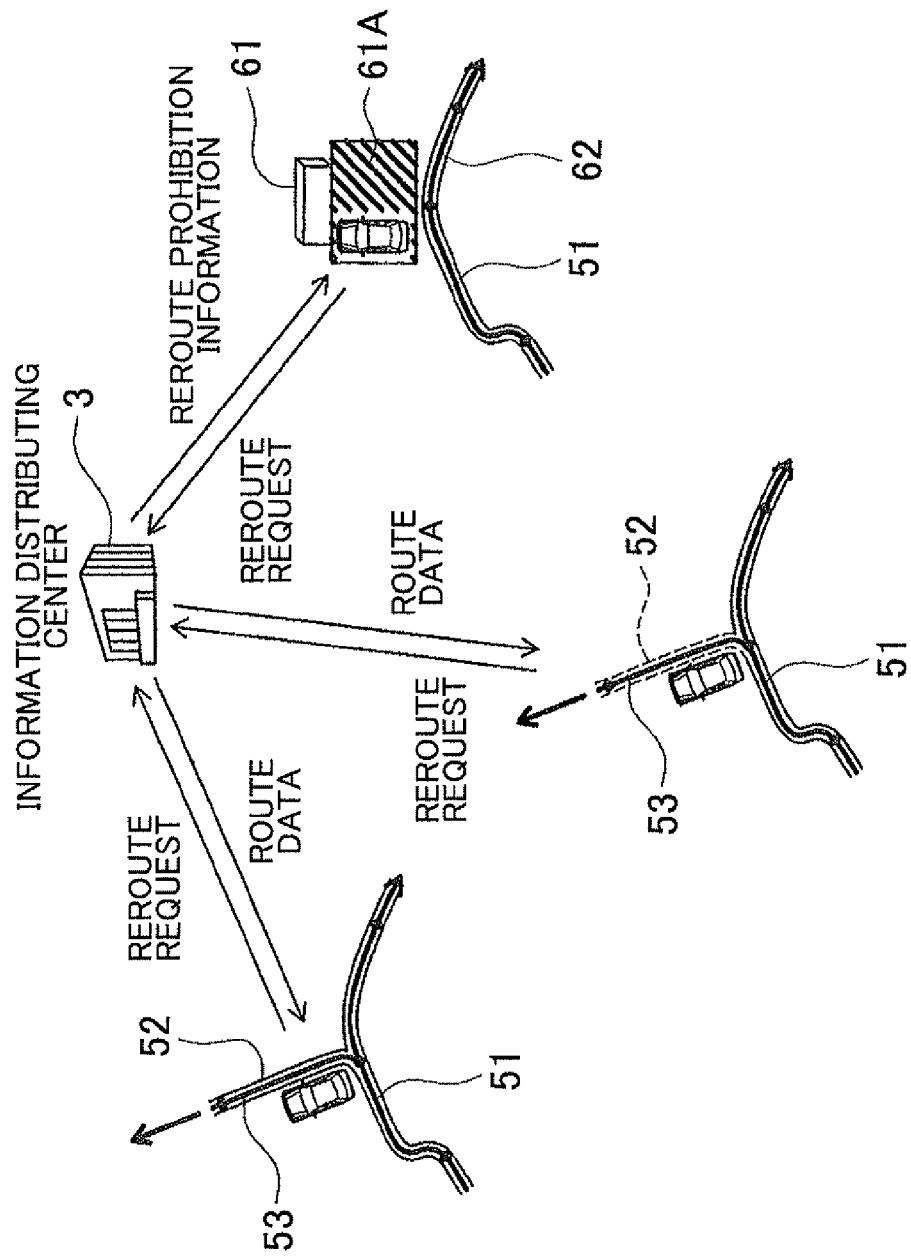

(12)  US 9,031,784 B2

NAVIGATION SYSTEM AND NAVIGATION METHOD

INCORPORATION BY REFERENCE

The disclosure of Japanese Patent Application No. 2011-248149, filed on Nov. 14, 2011, including the specification, drawings, and abstract thereof, is incorporated herein by reference in its entirety.

BACKGROUND

1. Related Technical Fields

Related technical fields include navigation systems and navigation methods.

2. Related Art

Conventionally, various technologies are being proposed, in which navigation devices receive guidance route data of a guidance route that was calculated in an information distributing center and provide route guidance.

For example, there are navigation systems, in which a navigation server calculates a guidance route, corrects current position information of a user of a navigation device by map-matching, creates corrected position information, and transmits the corrected position information to the navigation device; and the navigation device determines whether the current position has deviated from the guidance route, and when it has been determined that the current position has deviated from the guidance route, transmits the current position information to the navigation server (for example, refer to Japanese Patent Application; Publication No. JP-A-2011-47886).

SUMMARY

However, in the structure described in the aforementioned Japanese Patent Application Publication No. JP-A-2011-47886, when the navigation device deviates from the guidance route and enters a parking space of a facility, for example, the current position information is frequently transmitted to the navigation server and a request for route recalculation is performed, which may cause a problem that the communication volume between the navigation device and the navigation server increases.

Thus, exemplary implementations of the broad inventive principles described herein provide a navigation system and a navigation method that are capable of reducing unnecessary communication between the navigation device and the information distributing center.

According to exemplary implementations, when a detected current position has deviated from a guidance route, a navigation device transmits a reroute calculation condition to an information distribution center including the current position and the destination. Based on the reroute calculation condition, the information distribution center determines whether a distance from the current position to a closest adjacent link is equal to or shorter than a predetermined distance. When the distance from the current position to the closest adjacent link is longer than the predetermined distance, the information distribution center distributes to the navigation device reroute prohibition information including information regarding the adjacent link and a maximum waiting time. The maximum waiting time is a time that must elapse before the navigation device can again transmit the reroute calculation condition.

According to exemplary implementations, it is possible to prevent the reroute calculation condition from being frequently transmitted from the navigation device to the information distributing center, thereby reducing unnecessary communication.

BRIEF DESCRIPTION OF THE DRAWINGS

FIG. 6 is an exemplary drawing showing an example of transmitting reroute requests from the navigation device to an information distributing center.

DETAILED DESCRIPTION OF EXEMPLARY IMPLEMENTATIONS

Hereinafter, a specific example of a navigation system and a navigation method will be explained in detail with reference to the drawings.

Figure 1:
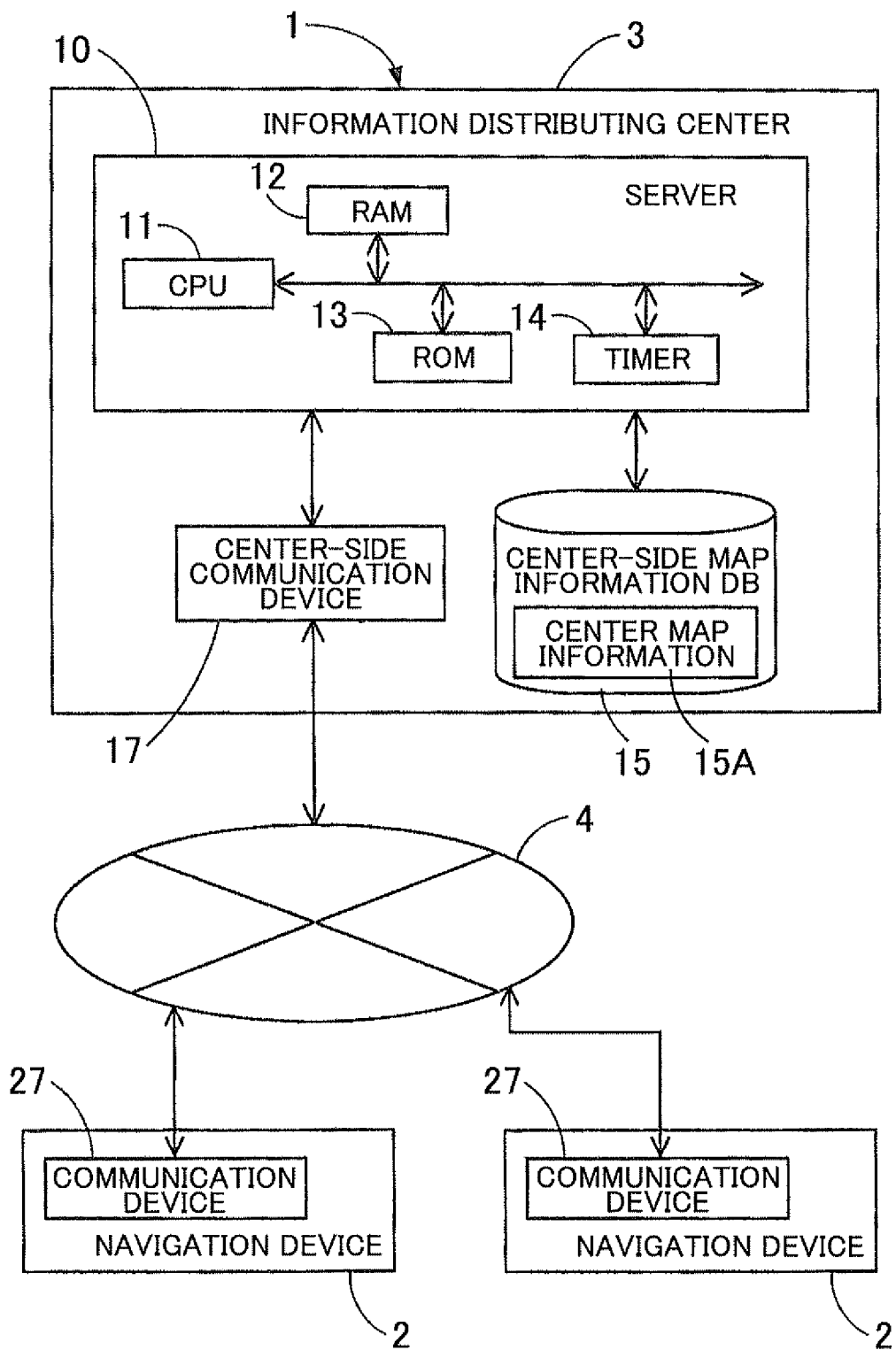
FIG. 1 is a block diagram showing an example of a structure of a navigation system according to the present example.

First, a schematic structure of a navigation system 1 according to the present example will be explained with reference to FIG. 1. FIG. 1 is a block diagram showing the navigation system 1 according to the present example.

As shown in FIG. 1, the navigation system 1 according to the present example basically includes a navigation device 2, an information distributing center 3 that distributes update information for updating map information for the navigation device 2 and various kinds of information such as route data of guidance route calculated as described below, and a network 4. The navigation device 2 and the information distributing center 3 are structured so as to be able to transmit and receive various kinds of information through the network 4.

The structure of the navigation device 2 will be explained in detail later with reference to FIG. 2.

In addition, as the network 4, communication systems such as, for example, a cellular phone network, a telephone network, a public communication network, a private communication network, a communication network such as an Internet can be utilized. The network 4 is connected to a road traffic information center (not shown). The information distributing center 3 is structured to be able to receive traffic information at predetermined time intervals through the network 4 and create current traffic information. The traffic information includes information regarding road congestion, which is created by collecting information of a traffic control system such as police and Japan Highway Public Corporation, and traffic regulation information, and the like.

As shown in FIG. 1, the information distributing center 3 is provided with a server 10 (which is a type of controller), a center-side map information database (a center-side map information DB) 15 serving as a map information recording part connected to the server 10, and a center-side communication device 17.

The server 10 is provided with: a CPU 11 serving as a computing device and a control device for performing overall control of the server 10; internal storage mediums such as a RAM 12 used as a working memory when the CPU 11 executes various arithmetic processing and a ROM 13 recording various kinds of programs for control which execute "route information distributing processing" for distributing through the network 4 route data of a guidance route calculated per a request from the navigation device 2 as described later and the like; a timer 14 for measuring a time; and the like. (Note: the term "storage medium" as used herein is not intended to encompass transitory signals.)

The center-side map information DB 15 stores for each version center map information 15A that is created in the information distributing center 3, the center map information 15A based on which map information stored in the navigation device 2 is updated. Further, the center-side map information DB 15 stores for each version update information (hereinafter, referred to as "differential data") for updating a part (for example, an area of 80 km square centered at the current position of the vehicle and previously registered home) of or all of the current map information stored in the navigation device 2 to the latest version stored in the center map information 15A. The version here is created time information to determine the time when the map information was created. The time when the map information was created can be determined by referring to the version.

The center map information 15A stored in the center-side map information DB 15 stores various kinds of information necessary for route guidance and map display in the navigation device 2. For example, the center map information 15A includes map display data for displaying a map, intersection data regarding intersections, node data regarding node points, link data regarding roads (links), route calculation data for calculating a route, facility data regarding POIs (Point of Interest) such as a shop that is a kind of facilities, point search data for searching for a point, and the like.

Next, a schematic structure of the navigation system 2 composing the navigation system 1 will be explained with reference to FIG. 2.

Figure 2:
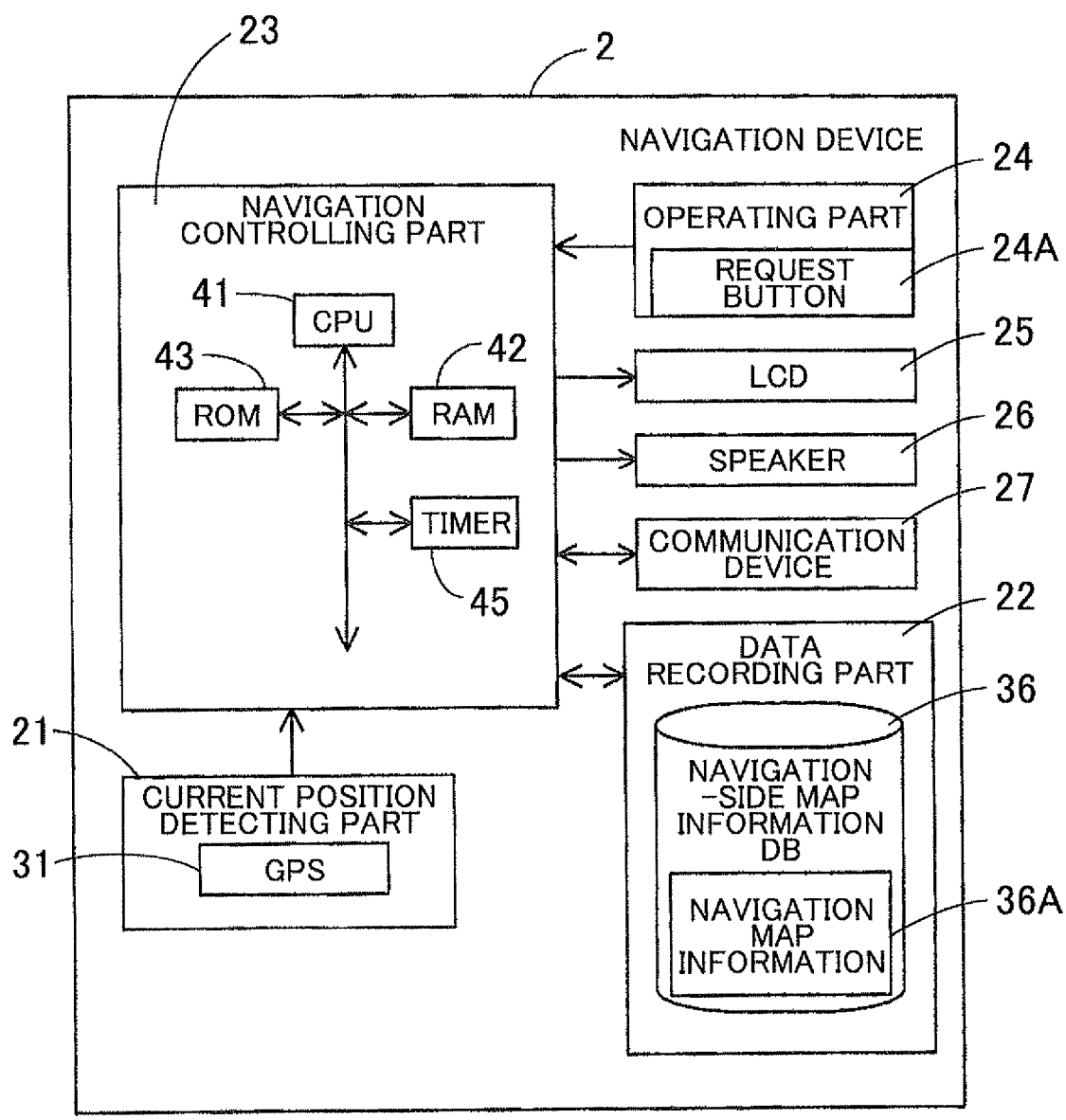
FIG. 2 is a block diagram showing an example of a structure of a navigation device shown in FIG. 1.

As shown in FIG. 2, the navigation device 2 includes: a current position detecting part 21 that detects a current position (hereinafter, referred to as "vehicle position") of a vehicle; a data recording part 22 in which various kinds of data is recorded; controller (e.g., a navigation controlling part 23) that performs various kinds of arithmetic processing based on input information; an operating part 24 that accepts an operation from an operator; a liquid crystal display (LCD) 25 that displays information of a map and the like to the operator; a speaker 26 that outputs audio guidance regarding route guidance and the like; and a communication device 27 that performs communication with a road traffic information center 5, the information distributing center 3, and the like via a cellular phone network. Output signals from a vehicle speed sensor (not shown) that detects a vehicle speed of the vehicle may be input to the navigation controlling part 23.

Hereinafter, the respective components composing the navigation device 2 are explained. The current position detecting part 21 includes a GPS 31 and the like. The vehicle position, a vehicle direction, a travel distance, and the like can be detected. A directional sensor, a distance sensor, and the like may be connected to the current position detecting part 21.

The data recording part 22 is provided with a hard disk (not shown) and a flash memory (not shown) serving as an external storage medium, and a navigation-side map information database (a navigation-side map information DB) 36 stored in the hard disk, the flash memory, and the like. The navigation-side map information DB 36 stores navigation map information 36A used for route guidance, route display of the navigation device 2, and the like.

The navigation map information 36A includes various kinds of information necessary for route guidance and map display. For example, the navigation map information 36A includes newly-constructed road information for identifying newly-constructed roads, map display data for displaying a map, intersection data regarding intersections, node data regarding node points, link data regarding roads (links), facility data regarding POIs (Point of Interest) such as a shop that is a kind of facilities, point search data for searching for a point, and the like. The contents of the navigation-side map information DB 36 are updated by downloading update information distributed from the information distributing center 3.

The navigation controlling part 23 is provided with: a CPU 41 serving as a computing device and a control device for performing overall control of the navigation device 2; internal storage mediums such as a RAM 42 used as a working memory when the CPU 41 executes various arithmetic processing and in which route data of received guidance route or the like is stored and a ROM 43 which records a program for control; a timer 45 for measuring a time; and the like.

In addition, the ROM 43 stores various kinds of programs such as route guidance processing (refer to FIG. 3) for providing guidance according to route data of the guidance route received from the information distributing center 3 and the like, as described later.

Further, the navigation controlling part 23 is electrically connected to respective peripheral devices (actuators) of the operating part 24, the liquid crystal display 25, the speaker 26, and the communication device 27.

The operating part 24 is operated when correcting the current position at the time of starting travel and inputting a departure point as a guidance start point and a destination as a guidance end point, or when performing search for information relating to a facility, and includes a request button 24A for inputting a reroute request to request the information distributing center 3 for recalculation of a guidance route when the vehicle position deviated from the guidance route, various keys and a plurality of operation switches. The navigation controlling part 23 controls to execute corresponding operation based on switch signals output by pressing each switch and the like. Further, a touch panel composing the operating part 24 is provided on a front face of the liquid crystal display 25, where various instruction commands can be input through pressing a button displayed on the screen.

On the liquid crystal display 25, in addition to a route guidance screen in which a map is displayed based on the navigation map information 36A and traffic information on each link is displayed, operation guidance, an operation menu, key guidance, a guidance route from the current position to the destination, guidance information along the guidance route, traffic information, news, weather forecast, time, E-mail, TV programs, and the like are displayed.

The speaker 26 outputs audio guidance for traveling along the guidance route based on an instruction from the navigation controlling part 23, and the like. For example, the audio guidance as "200 m ahead, to the right direction at XX intersection." is provided.

The communication device 27 is a communication unit that performs communication with the information distributing center 3 through a cellular phone network or the like. The communication device 27 receives or transmits from or to the information distributing center 3 update map information of a latest version, current traffic information, route data of guidance route, and the like.

Next, a "route guidance processing" method will be described with reference to the algorithms shown in FIGS. 3-5 and the diagram in FIG. 6. The algorithms may be implemented in the form of computer programs that are stored in, for example, one or more of the recording mediums included in the information distributing center 1 and/or the navigation device 2, and executed by the CPU 11 and/or CPU 41. Although the structure of the above-described information distributing center 1 and navigation device 2 is referenced in the description of the process, the reference to such structure is exemplary, and the method need not be limited by the described structure.

Figure 3:
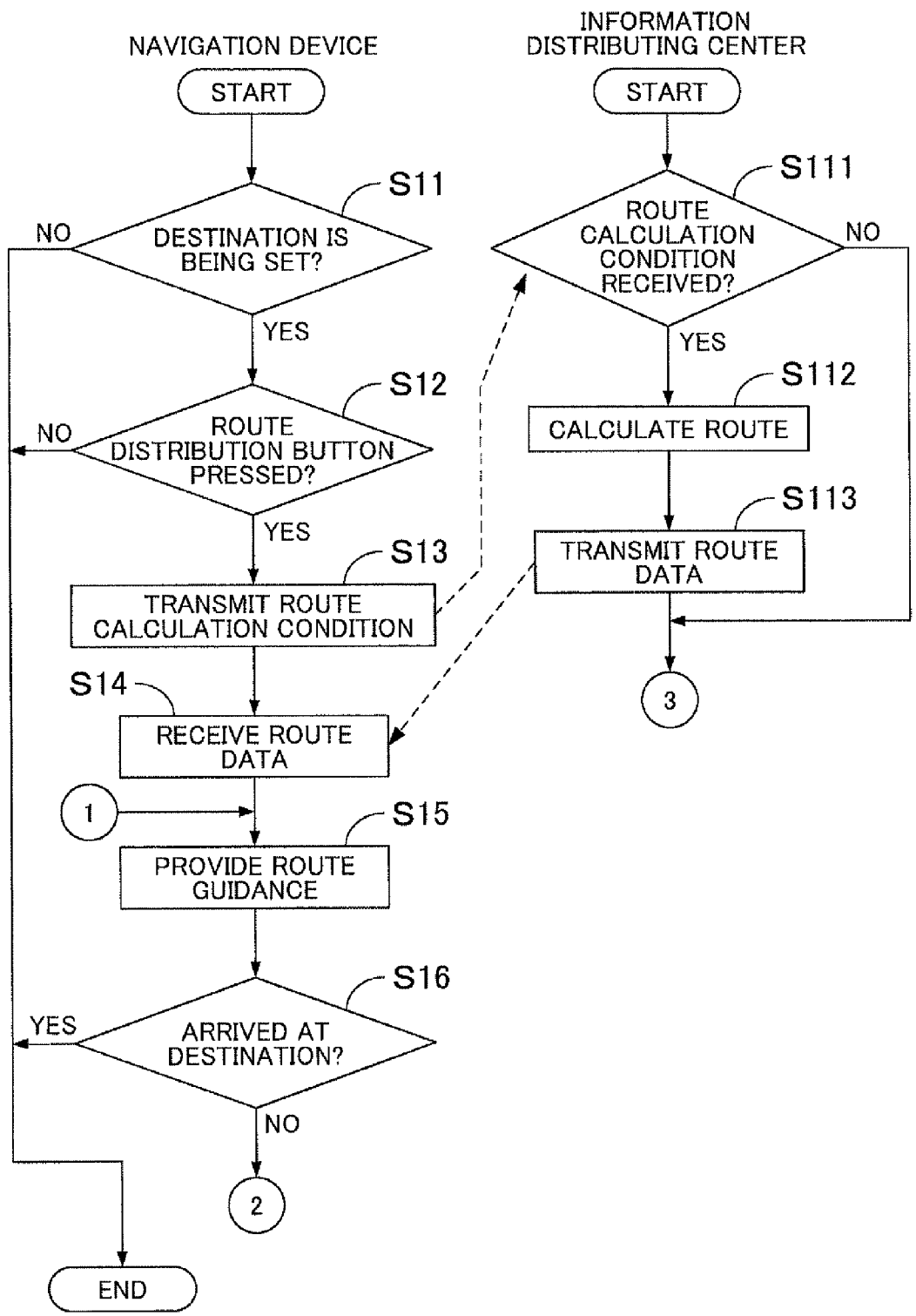
FIGS. 3 and 4 are a main flowchart showing an example of a processing algorithm of the navigation system according to the present example.
Figure 4:
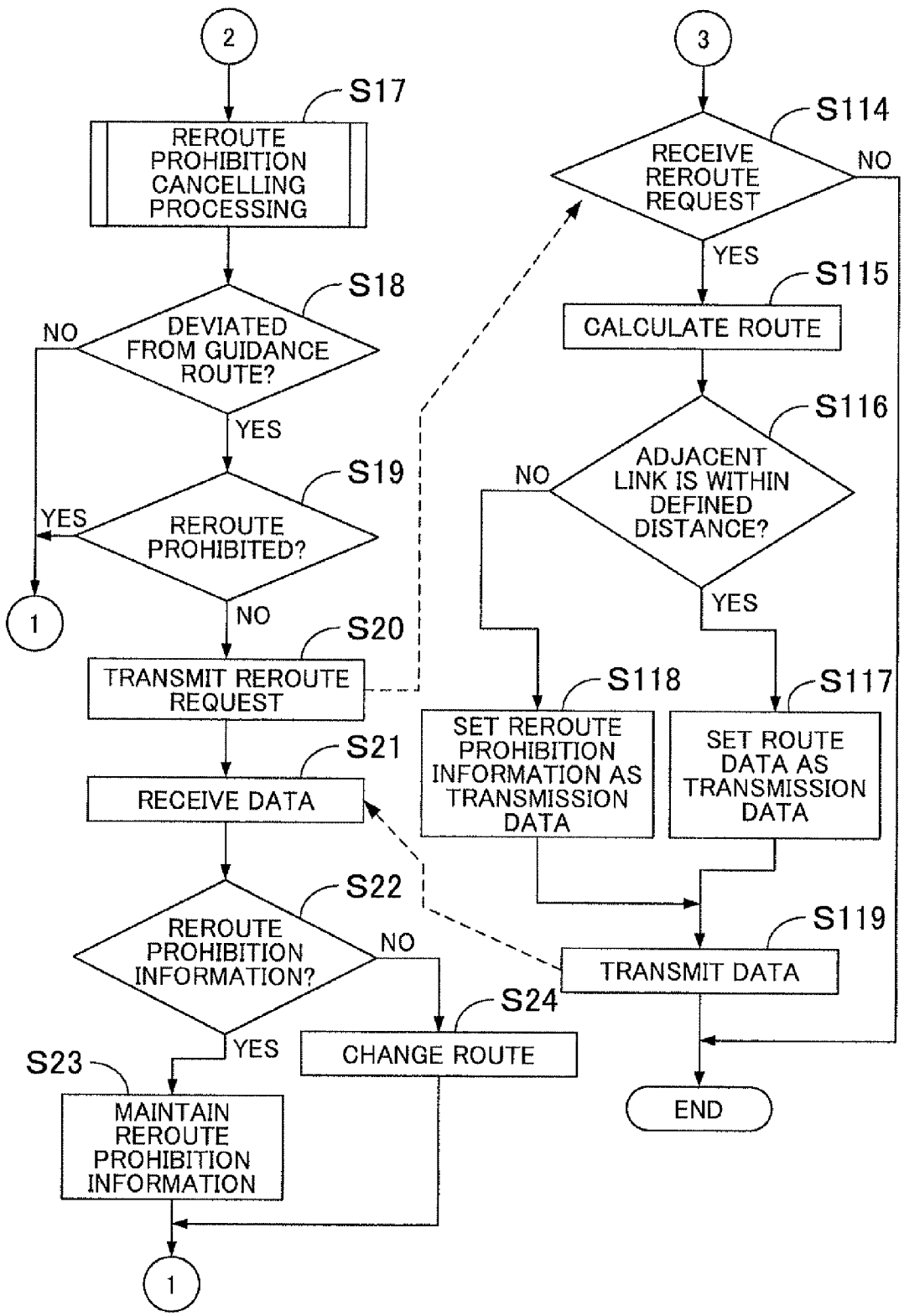

The program shown by S11 to S24 of the flowchart on the left side of FIGS. 3 and 4 is stored in the ROM 43 of the navigation device 2 and executed at predetermined time intervals (for example, every 10 msec to 100 msec) by the CPU 41. The program shown by S111 to S119 of the flowchart on the right side of FIGS. 3 and 4 is stored in the ROM 13 of the information distributing center 3 and executed at predetermined time intervals (for example, every 10 msec to 100 msec) by the CPU 11.

Processing of Navigation Device 2

As shown in FIGS. 3 and 4, first, at Step (hereinafter, referred as S) 11, the CPU 41 of the navigation device 2 executes determining processing to determine whether a departure point and a destination are being set by an input operation on the operating part 24 such as a touch panel, an operation switch, or the like.

When it has been determined that a departure point and a destination are not being set (S11: NO), the CPU 41 terminates the current processing.

On the other hand, when it has been determined that a departure point and a destination are being set (S11: YES), the CPU 41 stores the departure point and the destination in the RAM 42 and proceeds to the processing at S12. At S12, the CPU 41 executes determining processing to determine whether a route distributing button (not shown) of the operating part 24 to request calculation of the guidance route from the departure point to the destination has been pressed within a predetermined time period (for example, within 30 sec.). When it has been determined that the route distributing button of the operating part 24 has not been pressed within the predetermined time period (S12: NO), the CPU 41 terminates the current processing.

On the other hand, when it has been determined that the route distributing button of the operating part 24 has been pressed within the predetermined time period (S12: YES), the CPU 41 proceeds to the processing at S13. At S13, the CPU 41 reads out the departure point and the destination from the RAM 42, transmits a route calculation condition including at least the departure point and the destination together with a "navigation identification ID" (for example, a navigation identification ID "1001") to identify the navigation device 2 through the communication device 27 to the information distributing center 3 to request distribution of the guidance route. Thereafter, the CPU 41 proceeds to the processing at 814. The departure point may be the vehicle position (the current position) detected by the current position detecting part 21. In addition, the route calculation condition may include a waypoint.

Processing of Information Distributing Center 3

At S111, the CPU 11 of the information distributing center 3 executes determining processing to determine whether the route calculation condition including at least the departure point and the destination, and the navigation identification ID have been received through the center-side communication device 17. Then, it has been determined that the route calculation condition including at least the departure point and the destination, and the navigation identification ID have not been received (S111: NO), the CPU 11 proceeds to the processing at S114.

On the other hand, when it has been determined that the route calculation condition including at least the departure point and the destination, and the navigation identification ID have been received (S111: YES), the CPU 11 stores the route calculation condition and the navigation identification ID in the RAM 12 and proceeds to the processing at S112. At S112, the CPU 11 calculates a guidance route from the departure point to the destination using, for example, Dijkstra method based on the center map information 15A, the current traffic information, and the like, and stores the route data of the guidance route in the RAM 12. The route data includes a coordinate point sequence including coordinates (for example, latitude and longitude) of both ends (nodes) of each link on the guidance route and coordinates of shape interpolating points between both ends. The shape interpolating points indicate the shape of each link.

Subsequently, at S113, the CPU 11 reads out the route data of the calculated guidance route and the navigation identification ID from the RAM 12, distributes the route data of the calculated guidance route through the center-side communication device 17 to the navigation device 2 that is identified by the navigation identification ID, and proceeds to the processing at S114.

Processing of Navigation Device 2

As shown in FIG. 3, at S14, the CPU 41 of the navigation device 2 stores the route data distributed from the information distributing center 3 in the RAM 42, and thereafter identifiably displays the route data as the guidance route in a bold blue line in the map displayed on the liquid crystal display 25.

Subsequently, at S15, the CPU 41 reads out node data regarding each node point on the guidance route sequentially from the vehicle position to the destination from the navigation map information 36A, and determines whether each node point on the guidance route is located at an intersection in the map. When it has been determined that the node point on the guidance route is located at an intersection, the CPU 41 stores the node point as a guidance branch point in the RAM 42 sequentially from the vehicle position to the destination.

The CPU 41 displays the vehicle position on the guidance route with a vehicle position mark and provides route guidance along the guidance route. In addition, the CPU 41 reads out a guidance branch point on the guidance route, which is closest to the vehicle position mark in relation to a travel direction. When the distance from the vehicle position to the guidance branch point has become a predetermined distance (for example, approx. 50 m), the CPU 41 provides guidance for the travel direction at the guidance branch point.

Subsequently, at S16, the CPU 41 executes at predetermined time intervals (for example, every approx. 100 msec) determining processing to determine whether the vehicle position has arrived at the destination. Specifically, the CPU 41 reads out an arrival determination distance (for example, approx. 100 m) from the ROM 43 and determines whether the distance from the vehicle position to the destination has become less than the arrival determination distance. When it has been determined that the distance from the vehicle position to the destination has become less than the arrival determination distance (S16: YES), the CPU 41 provides audio guidance indicating that the vehicle position has arrived at the destination, or displays guidance indicating that the vehicle position has arrived at the destination on the liquid crystal display 25, and terminates the current processing.

On the other hand, it has been determined that the distance from the vehicle position to the destination is equal to or longer than the arrival determination distance (S16: NO), the CPU 41 proceeds to the processing at S17. As shown in FIG. 4, at S17, the CPU 41 executes sub-processing (refer to FIG. 5) of "reroute prohibition cancelling processing" to enable to transmit anew to the information distributing center 3 a recalculation request (hereinafter, referred to as "reroute request") of the guidance route which is described later, and thereafter proceeds to the processing at S18.

At S18, the CPU 41 executes determining processing to determine whether the vehicle position has deviated from the guidance route, that is, whether the vehicle position is located outside an area of a predetermined radius from coordinates (for example, latitude and longitude) on the guidance route. When the vehicle position is located within the area of the predetermined radius from the coordinates on the guidance route (S18: NO), the CPU 41 determines that the vehicle position has not deviated from the guidance route and executes anew the processing at S15 and subsequent processing.

On the other hand, when the vehicle position is located outside the area of the predetermined radius from the coordinates on the guidance route (S18: YES), the CPU 41 determines that the vehicle position has deviated from the guidance route and proceeds to the processing at S19. At S19, the CPU 41 executes determining processing to read out a reroute prohibition flag from the RAM 42 and determine whether the reroute prohibition flag is being set to "ON," that is, whether the navigation device 2 is in a reroute prohibited state in which it is prohibited to transmit a reroute request to the information distributing center 3. The reroute prohibition flag is stored being set to "ON" in the RAM 42 when the navigation device 2 is started.

When the reroute prohibition flag is being set to "ON," that is, when it has been determined that the navigation device 2 is in the reroute prohibited state (S19: YES), the CPU 41 does not transmit a reroute request to the information distributing center 3 and executes anew the processing at S15 and subsequent processing.

When the reroute prohibition flag is being set to "OFF," that is, when it has been determined that the navigation device 2 is not in the reroute prohibited state (S19: NO), the CPU 41 proceeds to the processing at S20. At S20, the CPU 41 reads out the destination from the RAM 42 and transmits to the information distributing center 3 a route recalculation condition including at least the vehicle position (the current position) and the destination together with the navigation identification ID as a reroute request.

Processing of Information Distributing Center 3

As shown in FIG. 4, at S114, the CPU 11 of the information distributing center 3 executes determining processing to determine whether the route recalculation condition including at least the vehicle position (the current position) and the destination, and the navigation identification ID have been received through the center-side communication device 17. When it has been determined that the route recalculation condition including at least the vehicle position (the current position) and the destination, and the navigation identification ID have not been received (S114: NO), the CPU 11 terminates the current processing.

On the other hand, when it has been determined that the route recalculation condition including at least the vehicle position (the current position) and the destination, and the navigation identification ID have been received (S114: YES), the CPU 11 stores the route recalculation condition and the navigation identification ID in the RAM 12 and proceeds to the processing at S115. At S115, the CPU 11 recalculates a guidance route from the vehicle position (the current position) to the destination, for example, using Dijkstra method or the like based on the center map information 15A, the current traffic information, and the like, and stores the route data of the recalculated route in the RAM 12.

Subsequently, at S116, the CPU 11 executes determining processing to calculate the distance from the vehicle position (the current position) to the closest link (hereinafter, referred to as "adjacent link") among links on the recalculated route and determine whether the distance is equal to or shorter than a defined distance (for example, the defined distance is approx. 10 m), that is, whether the vehicle position (the current position) is located on the recalculated route. The defined distance is previously stored in the center-side map information DB 15.

When it has been determined that the distance from the vehicle position (the current position) to the closest link is equal to or shorter than the defined distance (S116: YES), the CPU 11 proceeds to the processing at S117. At S117, the CPU 11 stores anew the route data of the recalculated route as transmission data to the navigation device 2 in the RAM 12 and proceeds to the processing at S119.

On the other hand, it has been determined that the distance from the vehicle position (the current position) to the adjacent link is longer than the defined distance (S116: NO), the CPU 11 proceeds to the processing at S118. At S118, the CPU 11 stores, as transmission data to the navigation device 2, "reroute prohibition information" including at least "link data" of the adjacent link and "maximum waiting time" before transmitting a reroute request to the information distributing center 3 next time, and proceeds to the processing at S119.

Subsequently, at S119, the CPU 11 reads out the transmission data to the navigation device 2 and the navigation identification ID from the RAM 12, distributes the transmission data to the navigation device 2 identified by the navigation identification ID through the center-side communication device 17, and terminates the current processing.

Processing of Navigation Device 2

At S21, the CPU 41 of the navigation device 2 stores the transmission data distributed from the information distributing center 3 in the RAM 42.

Subsequently, at S22, the CPU 41 executes determining processing to read out the transmission data distributed from the information distributing center 3 from the RAM 42 and determine whether the transmission data is "reroute prohibition information."

When it has been determined that the transmission data distributed from the information distributing center 3 is "reroute prohibition information" (S22: YES), the CPU 41 proceeds to the processing at S23. At S23, the CPU 41 reads out the reroute prohibition flag from the RAM 42, sets to "ON," and stores it anew in the RAM 42. In addition, the CPU 41 initializes a timer counter stored in the RAM 42, reads out the "maximum waiting time" included in the reroute prohibition information, and starts counting till the count value of the timer counter reaches the "maximum waiting time." Thereafter, the CPU 41 executes anew the processing at S15 and subsequent processing.

On the other hand, when it has been determined that the transmission data distributed from the information distributing center 3 is not the "reroute prohibition information," that is, the transmission data is the route data of the recalculated route (S22: NO), the CPU 41 proceeds to the processing at S24. At S24, the CPU 41 stores anew the route data of the recalculated route distributed from the information distributing center 3 as route data of a new guidance route in the RAM 42, as well as identifiably displays the route data in a bold blue line in the map displayed on the liquid crystal display 25. Thereafter, the CPU 41 executes anew the processing at S15 and subsequent processing.

Processing of Navigation Device 2

Next, "reroute prohibition cancelling processing" executed by the CPU 41 of the navigation device 2 at S17 is explained with reference to FIG. 5.

Figure 5:
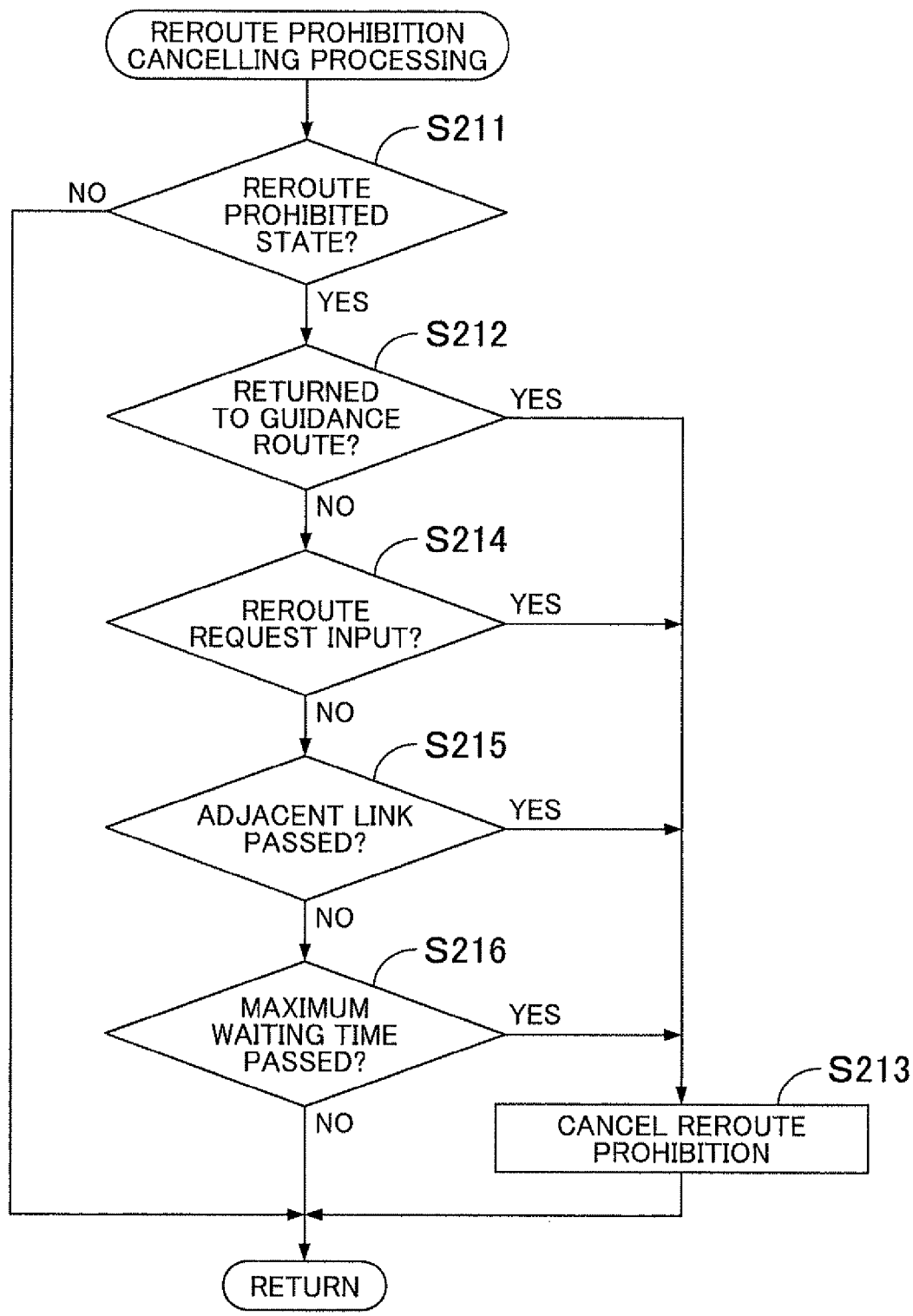
FIG. 5 is a sub-flowchart showing an algorithm for "reroute prohibition cancelling processing" to be executed by a CPU of the navigation device shown in FIG. 4.

As shown in FIG. 5, at S211, the CPU 41 executes determining processing to read out the reroute prohibition flag from the RAM 42 and determine whether the route prohibition flag is being set to "ON," that is, the navigation device 2 is in the reroute prohibited state, in which it is prohibited to transmit a reroute request to the information distributing center 3.

When the reroute prohibition flag is being set to "OFF," that is, it has been determined that the navigation device 2 is not in the reroute prohibited state (S211: NO), the CPU 41 terminates the current sub-processing, returns to the main flowchart, and proceeds to the processing at S18.

On the other hand, when the reroute prohibition flag is being set to "ON," that is, it has been determined that the navigation device 2 is in the reroute prohibited state (S211: YES), the CPU 41 proceeds to the processing at S212.

At S212, the CPU 41 executes determining processing to determine whether the vehicle position (the current position) is located on a link on the guidance route, that is, whether the vehicle position has returned to the guidance route. When it has been determined that the vehicle position (the current position) is located at a link on the guidance route, that is, the vehicle position has returned to the guidance route (S212: YES), the CPU 41 proceeds to the processing at S213. At S213, the CPU 41 reads out the reroute prohibition flag from the RAM 42, sets to "OFF," stores it anew in the RAM 42, that is, cancels the reroute prohibited state, and thereafter terminates the current sub-processing, returns to the main chart, and proceeds to the processing at S18.

On the other hand, when it has been determined that the vehicle position (the current position) is not located at a link on the guidance route, that is, the vehicle has not returned to the guidance route (S212: NO), the CPU 41 proceeds to the processing at S214. At S214, the CPU 41 executes determining processing to determine whether the request button 24A for inputting a reroute request to request the information distributing center 3 for recalculation of a guidance route has been pressed. When it has been determined that the request button 24A has been pressed (S214: YES), the CPU 41 proceeds to the processing at S213.

On the other hand, when it has been determined that the request button 24A has not been pressed (S214: NO), the CPU 41 proceeds to the processing at S215. At S215, the CPU 41 executes determining processing to read out the link data of the adjacent link included in the reroute prohibition information from the navigation map information 36A and determine whether the vehicle position (the current position) is located on the adjacent link, that is, whether the adjacent link has been passed through. When it has been determined that the adjacent link has been passed through (S215: YES), the CPU 41 proceeds to the processing at S213.

On the other hand, when it has been determined that the adjacent link has not been passed through (S215: NO), the CPU 41 proceeds to the processing at S216. At S216, the CPU 41 executes determining processing to read out the count value of the timer counter and the maximum waiting time included in the reroute prohibition information from the RAM 42 and determine whether the count value of the timer counter has reached the maximum waiting time, that is, whether the maximum waiting time has passed after the receipt of the reroute prohibition information.

When it has been determined that the maximum waiting time has passed after the receipt of the reroute prohibition information (S216: YES), the CPU 41 proceeds to the processing at S213.

On the other hand, when it has been determined that the maximum waiting time has not passed after the receipt of the reroute prohibition information (S216: NO), the CPU 41 terminates the sub-processing, returns to the main flowchart, and proceeds to the processing at S18. That is, the reroute prohibition flag is stored in the RAM 42 being set to "ON."

Here, an example of distributing the transmission data from the information distributing center 3 that has received a reroute request to the navigation device 2 is explained with reference to FIG. 6. The example shown on the left side of FIG. 6 illustrates a case in which the link data of a road 52 where the vehicle position entered after deviating from a guidance route 51 is stored in the navigation map information 36A. The example shown at the center of FIG. 6 illustrates a case in which the link data of the road 52 where the vehicle position entered after deviating from the guidance route 51 is not stored in the navigation map information 36A but stored in the center map information 15A of the information distributing center 3. The example shown on the right side of FIG. 6 illustrates a case in which the vehicle position went far from the guidance route 51 by more than a defined distance by parking in a parking lot 61A of a facility 61 such as a large shopping center adjacent to the guidance route 51.

As shown on the left side and at the center of FIG. 6, when the vehicle position (the current position) has deviated to the road 52 from the guidance route 51 displayed on the liquid crystal display 25, the navigation device 2 transmits a reroute request to the information distributing center 3. When receiving the reroute request, the CPU 11 of the information distributing center 3 distributes the route data of the recalculated route as the transmission data to the navigation device 2 because the navigation device 2 is located at an adjacent link 53 of the recalculated route on the road 52.

As shown on the right side of FIG. 6, when the vehicle position deviated from the guidance route 51 displayed on the liquid crystal display 25 and parked in the parking lot 61A of the facility 61 such as a large shopping center adjacent to the guidance route 51, the CPU 11 of the navigation device 2 determines that the vehicle position has deviated from the guidance route 51 and transmits a reroute request to the information distributing center 3. Thereafter, when receiving the reroute request, the CPU 11 of the information distributing center 3 determines that the distance from an adjacent link 62 of the recalculated guidance route 51 to a parked position (the current position) of the parking lot 61A is longer than the defined distance and distributes the reroute prohibition information as the transmission data to the navigation device 2.

When receiving the reroute prohibition information, the CPU 11 of the navigation device 2 reads out the reroute prohibition flag from the RAM 42, sets to "ON," stores it anew in the RAM 42 to set to be in the reroute prohibited state and wait till the maximum waiting time passes. When the navigation device 2 returns to the adjacent link 62 of the guidance route 51 from the parking lot 61A, the user presses a request button of the navigation device 2, or the maximum waiting time passes after the receipt of the reroute prohibition information, the CPU 41 sets the reroute prohibition flag to "OFF." Thereby, the CPU 41 can transmit anew the reroute request to the information distributing center 3 when the guidance route 51 has been deviated.

As explained in detail above, in the navigation system 1 according to the present example, the CPU 11 of the information distributing center 3 receives a reroute request from the navigation device 2 and determines that the distance from the vehicle position (the current position) to the adjacent link of the recalculated route is longer than the defined distance, and the CPU 11 of the information distributing center 3 distributes the "reroute prohibition information" including at least the "link data" of the adjacent link and the "maximum waiting time" to the navigation device 2. When the CPU 41 of the navigation device 2 has received the reroute prohibition information, the CPU 41 of the navigation device 2 transmits anew the reroute request to the information distributing center 3 after the maximum waiting time included in the reroute prohibition information passes.

Thereby, for example, when the navigation device 2 has deviated from the guidance route and entered the parking lot of a facility, the distance from the vehicle position (the current position) of the navigation device 2 to the adjacent link becomes longer than the defined distance (for example, approx. 10 m). Therefore, the CPU 11 of the information distributing center 3 can transmit the reroute prohibition information to the navigation device 2, which can reduce the communication amount.

When the CPU 41 of the navigation device 2 receives the reroute prohibition information after transmitting a reroute request to the information distributing center 3, the CPU 41 of the navigation device 2 transmits anew the reroute request after the maximum waiting time (for example, approx. 30 min.) passes after the receipt of the reroute prohibition information. Thereby, it becomes possible to prevent the navigation device 2 from transmitting the reroute request frequently to the information distributing center 3, which can reduce unnecessary communication.

After deviating from the guidance route and entering a parking lot of a facility or the like, if the vehicle position has passed through the adjacent link before the maximum waiting time passes after the receipt of the reroute prohibition information, that is, if the vehicle position has entered a recalculated route that is different from the guidance route, the CPU 41 of the navigation device 2 can transmit anew the reroute request. Thereby, after the vehicle position has deviated from the guidance route and entered a parking lot of a facility, the CPU 41 of the navigation device 2 can quickly receive anew the route data of the recalculated route from the information distributing center 3.

In addition, after deviating from the guidance route and entering a parking lot of a facility or the like, if the vehicle position has returned to the deviated guidance route before the maximum waiting time passes after the receipt of the reroute prohibition information, the CPU 41 of the navigation device 2 can provide route guidance based on the route data of the guidance route without transmitting anew the reroute request. Thereby, it is possible to reduce unnecessary communication.

Further, after deviating from the guidance route and entering a parking lot of a facility or the like, if the request button 24A for inputting a reroute request to request the information distributing center 3 for recalculation of a guidance route has been pressed before the maximum waiting time passes after the receipt of the reroute prohibition information, the CPU 41 of the navigation device 2 can transmit anew the reroute request. Thereby, after deviating from the guidance route and entering a parking lot of a facility or the like, when the user of the navigation device 2 departs the facility, it is possible to receive route data of the recalculated route quickly from the information distributing center 3 by pressing the request button 24A.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying inventive principles.

For example, when the CPU 11 of the information distributing center 3 has determined that the route recalculation condition including at least the vehicle position (the current position) and the destination, and the navigation identification ID have been received (S114: YES), the CPU 11 may store the route recalculation condition and the navigation identification ID in the RAM 12 and proceeds to the processing at S116 without executing the processing at S115.

At S116, the CPU 11 reads out the link data of the link (hereinafter, referred to as "an adjacent link on the map") closest to the vehicle position (the current position) based on the center map information 15A. Subsequently, the CPU 11 may execute determining processing to determine whether the distance from the vehicle position (the current position) to the "adjacent link on the map" is equal to or shorter than the defined distance (for example, the defined distance is approx. 10 m.).

When it has been determined that the distance from the vehicle position (the current position) to the "adjacent link on the map" is equal to or shorter than the defined distance (S116: YES), the CPU 11 may proceed to the processing at S117, recalculates (reroutes) the guidance route from the vehicle position (the current position) to the destination, and stores the route data of the recalculated route as the transmission data in the RAM 12.

When it has been determined that the distance from the vehicle position (the current position) to the "adjacent link on the map" is longer than the defined distance (S116: NO), the CPU 11 may proceeds to the processing at S118. Thereby, the same effects as the aforementioned example can be obtained. In addition, as the processing at S115 is not executed, the reroute prohibition information can be quickly transmitted, which can reduce the processing load of the CPU 11.

What is claimed is:

1. An information distributing center, comprising:
   a server that:
   when having received a route calculation condition including at least a departure point and a destination from a navigation device, calculates a guidance route from the departure point to the destination and creates guidance route data;
   distributes the guidance route data to the navigation device;
   receives a reroute calculation condition including a current position and the destination from the navigation device, the reroute calculation condition having been sent by the navigation device as a result of the navigation device having determined that the current position had deviated from the guidance route;
   determines whether a distance from the current position to a closest adjacent link is equal to or shorter than a predetermined distance; and when the distance from the current position to the closest adjacent link is longer than the predetermined distance, distributes to the navigation device reroute prohibition information including information regarding the adjacent link and a maximum waiting time, the maximum waiting time being a time that must elapse before the navigation device can again transmit the reroute calculation condition.

2. A navigation device, comprising:

a current position detecting unit that detects a current position; and a controller that:

distributes a route calculation condition including at least a departure point and a destination to an information distributing center;

receives guidance route data from the information distributing center, the route guidance data including a guidance route from the departure point to the destination;

provides route guidance based on the received guidance route data;

determines whether the current position has deviated from the guidance route;

when that the current position has deviated from the guidance route, transmits to the information distributing center a reroute calculation condition including the current position and the destination;

receives reroute prohibition information from the information distributing center, the reroute prohibition information having been created by the information distributing center because the information distributing center determined that a distance from the current position to a closest adjacent link was longer than a predetermined distance, the received reroute prohibition information including information regarding the adjacent link and a maximum waiting time, the maximum waiting time being a time that must elapse before the navigation device can again transmit the reroute calculation condition; and based on the received the reroute prohibition information, transmits anew the reroute calculation condition to the information distributing center after the maximum waiting time passes.

3. The navigation device according to claim 2, wherein the controller:

determines whether the adjacent link has been passed through before the maximum waiting time has elapsed; and when the adjacent link has been passed through before the maximum waiting time has elapsed, transmits anew the reroute calculation condition to the information distributing center.

4. The navigation device according to claim 3, wherein the controller:

determines whether the current position has returned to the guidance route after having deviated from the guidance route before the maximum waiting time has elapsed; and when the current position has returned to the guidance route after having deviated from the guidance route before the maximum waiting time has elapsed, prevents the transmission anew of the reroute calculation condition to the information distributing center and performs route guidance based on the received guidance route data.

5. The navigation device according to claim 2, wherein the controller:

receives an input requesting transmission of the reroute calculation condition to the information distributing center;

determines whether the input was received before the maximum waiting time has elapsed; and when the input was received before the maximum waiting time has elapsed, transmits anew the reroute calculation condition to the information distributing center.

6. A computer-readable storage medium storing a computer-executable information distributing program, the program comprising:

instructions for, when having received a route calculation condition including at least a departure point and a destination from a navigation device, calculating a guidance route from the departure point to the destination and creates guidance route data;

instructions for distributing the guidance route data to the navigation device;

instructions for receiving a reroute calculation condition including a current position and the destination from the navigation device, the reroute calculation condition having been sent by the navigation device as a result of the navigation device having determined that the current position had deviated from the guidance route;

instructions for determining whether a distance from the current position to a closest adjacent link is equal to or shorter than a predetermined distance; and instructions for, when the distance from the current position to the closest adjacent link is longer than the predetermined distance, distributing to the navigation device reroute prohibition information including information regarding the adjacent link and a maximum waiting time, the maximum waiting time being a time that must elapse before the navigation device can again transmit the reroute calculation condition.

7. A computer-readable storage medium storing a computer-executable navigation program, the program comprising:

instructions for detecting a current position;

instructions for distributing a route calculation condition including at least a departure point and a destination to an information distributing center;

instructions for receiving guidance route data from the information distributing center, the route guidance data including a guidance route from the departure point to the destination;

instructions for providing route guidance based on the received guidance route data;

instructions for determining whether the current position has deviated from the guidance route;

instructions for, when that the current position has deviated from the guidance route, transmitting to the information distributing center a reroute calculation condition including the current position and the destination;

instructions for receiving reroute prohibition information from the information distributing center, the reroute prohibition information having been created by the information distributing center because the information distributing center determined that a distance from the current position to a closest adjacent link was longer than a predetermined distance, the received reroute prohibition information including information regarding the adjacent link and a maximum waiting time, the maximum waiting time being a time that must elapse before the navigation device can again transmit the reroute calculation condition; and instructions for, based on the received the reroute prohibition information, transmitting anew the reroute calculation condition to the information distributing center after the maximum waiting time passes.

8. The computer-readable storage medium according to claim 7, the program further comprising;
   instructions for determining whether the adjacent link has been passed through before the maximum waiting time has elapsed; and
   instructions for, when the adjacent link has been passed through before the maximum waiting time has elapsed, transmitting anew the reroute calculation condition to the information distributing center.

9. The computer-readable storage medium according to claim 8, the program further comprising:
   instructions for determining whether the current position has returned to the guidance route after having deviated from the guidance route before the maximum waiting time has elapsed; and
   instructions for, when the current position has returned to the guidance route after having deviated from the guidance route before the maximum waiting time has elapsed, preventing the transmission anew of the reroute calculation condition to the information distributing center and performing route guidance based on the received guidance route data.

10. The computer-readable storage medium according to claim 7, the program further comprising:
    instructions for receiving an input requesting transmission of the reroute calculation condition to the information distributing center;
    instructions for determining whether the input was received before the maximum waiting time has elapsed; and
    instructions for, when the input was received before the maximum waiting time has elapsed, transmitting anew the reroute calculation condition to the information distributing center.

11. A navigation method comprising:
    a first group of steps executed in an information distributing center including:
       when having received a route calculation condition including at least a departure point and a destination from a navigation device, calculating a guidance route from the departure point to the destination and creating guidance route data; and
       distributing the created guidance route data to the navigation device;
    a second group of steps executed in a navigation device including:
       when having received the guidance route data from the information distributing center, providing route guidance based on the guidance route data;
       detecting a current position;
       determining whether the detected current position has deviated from the guidance route; and
       when the current position has deviated from the guidance route, transmitting to the information distributing center a reroute calculation condition including the current position and the destination;
    a third group of steps executed in the information distributing center including:
       when having received the reroute calculation condition from the navigation device, determining whether a distance from the current position to a closest adjacent link is equal to or shorter than a predetermined distance; and
       when the distance from the current position to the closest adjacent link is longer than the predetermined distance, distributing to the navigation device reroute prohibition information including information regarding the adjacent link and a maximum waiting time, the maximum waiting time being a time that must elapse before the navigation device can again transmit the reroute calculation condition; and
    a fourth group of steps executed in the navigation device including:
       when having received the reroute prohibition information from the information distributing center, transmitting anew the reroute calculation condition after the maximum waiting time has elapsed.

12. The navigation method according to claim 11, further comprising a fifth group of steps executed in the navigation device, including:
    determining whether the adjacent link has been passed through before the maximum waiting time has elapsed; and
    when the adjacent link has been passed through before the maximum waiting time has elapsed, transmitting anew the reroute calculation condition to the information distributing center.

13. The navigation method according to claim 12, further comprising a sixth group of steps executed in the navigation device, including:
    determining whether the current position has returned to the guidance route after having deviated from the guidance route before the maximum waiting time has elapsed; and
    when the current position has returned to the guidance route after having deviated from the guidance route before the maximum waiting time has elapsed, preventing the transmission anew of the reroute calculation condition to the information distributing center and performing route guidance based on the received guidance route data.

14. The navigation method according to claim 11, further comprising a fifth group of steps executed in the navigation device, including:
    receiving an input requesting transmission of the reroute calculation condition to the information distributing center;
    determining whether the input was received before the maximum waiting time has elapsed; and
    when the input was received before the maximum waiting time has elapsed, transmitting anew the reroute calculation condition to the information distributing center.

* * * * *